J. E. CROWELL.
MANUAL TENSION METER.
APPLICATION FILED MAR. 16, 1918.
1,277,874.
Patented Sept. 3, 1918.
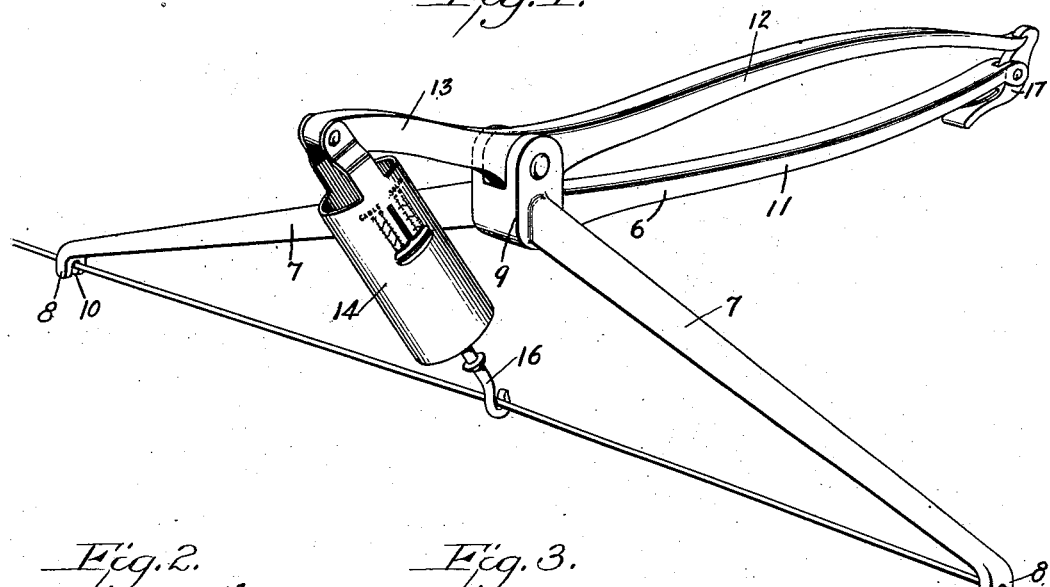
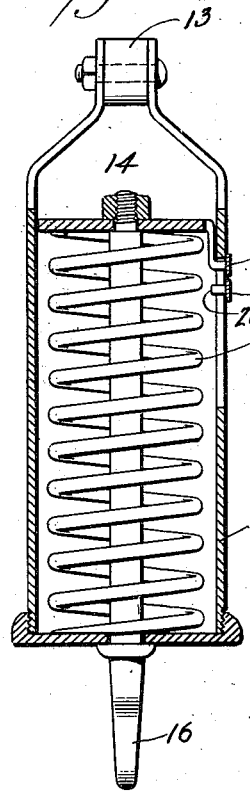
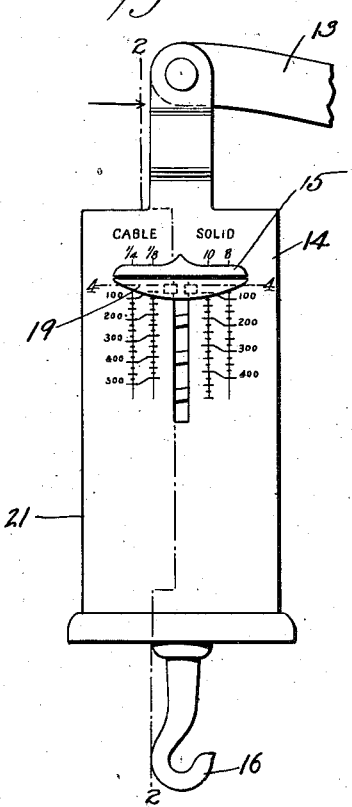
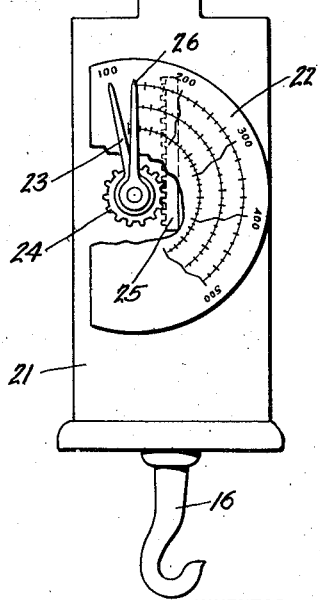
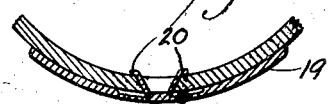
WITNESSES
INVENTOR
J. E. Crowell
BY
ATTORNEYS

UNITED STATES PATENT OFFICE.

JOHN E. CROWELL, OF UNION COUNTY, NORTH CAROLINA.

MANUAL TENSION-METER.

1,277,874. Specification of Letters Patent. Patented Sept. 3, 1918.

Application filed March 16, 1918. Serial No. 222,901.

*To all whom it may concern:*

Be it known that I, JOHN E. CROWELL, a citizen of the United States, and a resident of Union county, in the State of North Carolina, have invented a new and Improved Manual Tension-Meter, of which the following is a full, clear, and exact description.

My invention relates to a manual instrument for measuring the tension to which a wire is subjected. An object of the invention is to provide a simple and inexpensive manual device which can be easily and quickly applied to a wire under tension and the stress therein determined.

The device is characterized by the provision of a carrier frame having a span within which a portion of the wire, the tension of which is to be tested, is engaged, and a measuring device mounted on the frame and having means for engaging that portion of the wire to indicate the tension the same is subjected to.

I attain the above and other objects of my invention by the structure conventionally disclosed in the accompanying drawings, wherein similar characters of reference indicate corresponding parts in all the views.

Figure 1 is a perspective view of my device shown as applied for testing the tension of a wire;

Fig. 2, a longitudinal section through the measuring device on line 2—2, Fig. 3;

Fig. 3, an elevation of the measuring device;

Fig. 4, a cross section on line 4—4, Fig. 3; and

Fig. 5, a modified form of the scale arrangement.

Referring to the drawings, 6 is a spider frame the two arms 7 of which are in a common plane forming a flat V, the extremities 8 of the arms being turned away from the body 9 in the center of the frame. These extremities have slots 10 for stradling the wire. If desired, rollers may be provided therein to decrease the frictional engagement between the wire and the extremities of the arms 7. The third arm 11 which projects over the body 9 rearwardly of the arm 7 constitutes a handle with which coöperates a handle 12 forming part of a first-class lever pivotally mounted in the body 9, the shorter arm 13 of the lever extending beyond the plane of the arm 7.

A spring balance 14 is suspended from said extension 13. This spring balance is calibrated from wires of known tension for solid wires and cable wires. An indicator 15 of the spring balance is adapted to travel along these scales and indicate the tension.

The wire to be tested in engaged by the grooves of the arm 7, in other words, within the span of the frame. The hook 16 of the spring balance is brought into engagement with the wire spanned by the frame and pressure is then applied to the handles 11 and 12. The handle 11 carries a spring-actuated catch 17 which catches the handle 12 when the same is brought against the catch. The movement of the handles stresses the spring 18 of the balance and thereby causes the displacement of the indicator 15. The spring balance is calibrated from wire of known tension and the divisions are made at the points of the indicator when the two handles are retained by the catch in the relation shown in Fig. 1. Therefore, whenever tension is to be measured the handles must be brought to that relation for the proper reading.

This instrument is particularly adapted for obtaining uniform stress in wire used in aeroplanes. It permits of stressing the wires to equal tension by leaving the tool on the wire while the same is stretched. To permit the utilization of this device for indicating the variation of tension to which a wire is subjected during flying, I provide a sliding indicator 19 which can be brought against the indicator 15 of the spring balance. The indicator 19 has prongs 20 engaging the inner surface of the balanced barrel. When the sliding indicator 19 is against the indicator 15 the displacement of the indicator 15 wil cause a displacement of the indicator 19 and thereby the maximum strain to which the wire will be subjected during the flying will be indicated by the sliding indicator 19, for it will remain in that extreme position to which the indicator 15 has been moved.

The spring balance in Fig. 5 has an arcuate scale 22. A hand 23, which forms the indicator of that scale, is constrained to revolve with a pinion 24. The pinion 24 meshes with a rack 25 which is constrained to move with the hook 16 of the balance. This arrangement of scale permits a reading of greater exactness, as the number of readings per unit of scale may be increased. An idler indicator 26 is mounted on the axis of the pinion so as to be entrained by the movement of the hand 23 for the same purpose as referred to in regard to the sliding indicator 19.

I claim:

1. A manual tension meter comprising, in combination, a spring balance, a three-arm spider frame having two arms forming a span, and a lever of the first class on said spider frame coöperating with a third arm of the frame to form handles therewith and engaging the spring balance so as to present the same in the span.

2. A manual tension meter comprising, in combination, a spider frame having three arms, two arms of said frame being in a common plane and forming a span therebetween, the ends of said arms having means for engaging a wire, a lever of the first class pivotally connected to the frame to be in a plane with the third arm, and to form therewith the handles and a spring balance suspended from the shorter arm of said lever to engage a wire within the span.

3. A manual tension meter comprising, in combination, a spider frame having three arms, two of the arms being in a common plane and forming a span, the third arm being substantially in a plane at right angles to the plane of the other arms, means at the ends of the two arms in the plane for engaging a wire, a lever of the first class pivotally mounted in the frame so as to present the longer arm of same opposite the third arm of the spider frame with which it forms the handles for the meter, a balance suspended from the shorter arm of the first-class lever so that the same may engage a wire in the span, and means for locking the lever to the third arm of the frame.

JOHN E. CROWELL.